(12) United States Patent
Kwon et al.

(10) Patent No.: US 11,727,731 B2
(45) Date of Patent: Aug. 15, 2023

(54) VEHICLE AND CONTROL METHOD THEREOF

(71) Applicants: HYUNDAI MOTOR COMPANY, Seoul (KR); KIA MOTORS CORPORATION, Seoul (KR); Kyungshin Corp., Incheon (KR)

(72) Inventors: Ji Heon Kwon, Seoul (KR); Kwang Hae Ye, Seoul (KR); Insun Oh, Incheon (KR); Jaesung Bae, Incheon (KR)

(73) Assignees: Hyundai Motor Company, Seoul (KR); Kia Motors Corporation, Seoul (KR); Kyungshin Corp., Incheon (KR)

( * ) Notice: Subject to any disclaimer, the term of this patent is extended or adjusted under 35 U.S.C. 154(b) by 517 days.

(21) Appl. No.: 17/085,756

(22) Filed: Oct. 30, 2020

(65) Prior Publication Data

US 2021/0304529 A1 Sep. 30, 2021

(30) Foreign Application Priority Data

Mar. 31, 2020 (KR) ........................ 10-2020-0039200

(51) Int. Cl.
*G07C 5/08* (2006.01)
*H04L 1/08* (2006.01)
*G07C 5/00* (2006.01)

(52) U.S. Cl.
CPC ........... *G07C 5/0808* (2013.01); *G07C 5/008* (2013.01); *G07C 5/0841* (2013.01); *H04L 1/08* (2013.01)

(58) Field of Classification Search
CPC .... G07C 5/0808; G07C 5/008; G07C 5/0841; G07C 5/02; G07C 5/08; H04L 1/08; G08G 1/0104; H04W 4/44; H04W 4/46; B60R 16/02
See application file for complete search history.

(56) References Cited

U.S. PATENT DOCUMENTS

| | | | | |
|---|---|---|---|---|
| 9,672,738 | B1* | 6/2017 | Ferguson | G08G 1/096844 |
| 10,564,619 | B2* | 2/2020 | Tsuneki | G05B 19/19 |
| 2011/0118933 | A1* | 5/2011 | Sakai | G07C 5/0808 |
| | | | | 701/31.4 |
| 2018/0267499 | A1* | 9/2018 | Tsuneki | G06N 20/00 |
| 2019/0221057 | A1* | 7/2019 | Shibata | G07C 5/02 |

* cited by examiner

*Primary Examiner* — Sizo B Vilakazi
(74) *Attorney, Agent, or Firm* — Slater Matsil, LLP

(57) ABSTRACT

A vehicle may include: a communication device configured to communicate with a server; and a controller configured to obtain a vehicle data through a network in the vehicle, obtain an analysis program and a setting information about the vehicle data from the server, analyze the vehicle data using the analysis program and the setting information, and control the communication device to transmit an analysis result data of the vehicle data to the server.

20 Claims, 9 Drawing Sheets

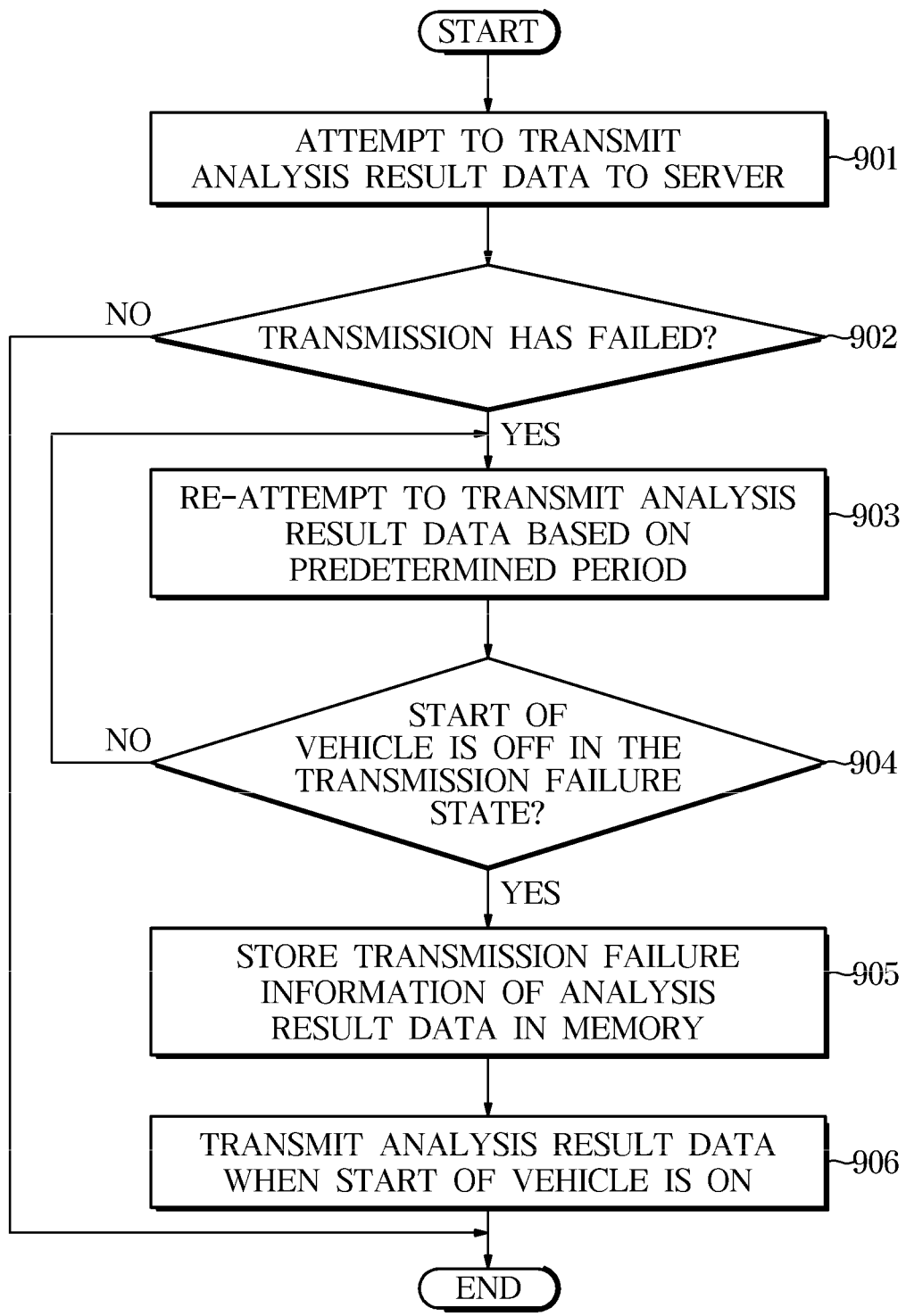

VEHICLE AND CONTROL METHOD THEREOF

CROSS-REFERENCE TO RELATED APPLICATION

This application claims priority to and the benefit of Korean Patent Application No. 10-2020-0039200, filed on Mar. 31, 2020, the entire contents of which are incorporated herein by reference.

TECHNICAL FIELD

The disclosure relates to a vehicle capable of analyzing vehicle data by obtaining analysis logic data from a server and a control method thereof.

BACKGROUND

The statements in this section merely provide background information related to the present disclosure and may not constitute prior art.

Previously, the vehicle data was transmitted to the server, and the server analyzed the vehicle data and then transmitted the necessary data to the vehicle again. However, as the vehicle requiring analysis and the corresponding vehicle data increased, a large amount of data was concentrated on the server. Therefore, the server was overloaded, and a real-time data analysis was impossible due to the delay in data processing time.

SUMMARY

The present disclosure provides a vehicle for securing real-time performance in analyzing vehicle data and reducing load on a server and a control method thereof.

In addition, the present disclosure provides a vehicle capable of changing an analysis logic or an analysis program used to analyze vehicle data without having to update the entire analysis system and a control method thereof.

In accordance with one aspect of the disclosure, a vehicle includes: a communication device configured to communicate with a server; and a controller configured to obtain a vehicle data through a network in the vehicle, obtain an analysis program and a setting information about the vehicle data from the server, analyze the vehicle data using the analysis program and the setting information, and control the communication device to transmit an analysis result data of the vehicle data to the server.

The controller may include a memory configured to store the vehicle data, the analysis program, the setting information and the analysis result data.

The controller may be configured to trigger an analysis event related to the vehicle data when the obtained vehicle data matches existing data stored in the memory.

The controller may be configured to trigger an analysis event related to the vehicle data after storing the vehicle data and a history data in the memory when the obtained vehicle data is different from existing data stored in the memory.

The setting information may include an execution time of the analysis program, a number of times of attempts to execute the analysis program, a transmission time of the analysis result data, and a transmission attempt period of the analysis result data.

The controller may be configured to record execution failure information in the setting information and suspend execution of the analysis program when the number of times of execution failure of the analysis program exceeds a predetermined number of times.

The controller may be configured to repeatedly attempt to transmit the analysis result data based on the transmission attempt period when transmission failure of the analysis result data occurs.

The controller may be configured to store transmission failure information of the analysis result data in the memory when the start of the vehicle is off in the transmission failure state of the analysis result data and control the communication device to transmit the analysis result data when the start of the vehicle is on.

When a transmission failure related to a plurality of analysis result data occurs and the size of the plurality of analysis result data failed to be transmitted exceeds a predetermined size, the controller may be configured to delete the plurality of analysis result data based on the order stored in the memory.

The controller may be configured to assign an index number to the vehicle data and delete the vehicle data based on the order stored in the memory when the index number exceeds a predetermined number.

In accordance with one aspect of the disclosure, a control method of a vehicle includes: obtaining vehicle data through the network in the vehicle; obtaining analysis program and setting information about the vehicle data from the server; analyzing the vehicle data using the analysis program and the setting information; and transmitting analysis result data of the vehicle data to the server.

The control method may further include: storing the vehicle data, the analysis program, the setting information and the analysis result data in a memory.

The analyzing the vehicle data may include: triggering an analysis event related to the vehicle data when the obtained vehicle data matches existing data stored in the memory.

The analyzing the vehicle data may include: triggering an analysis event related to the vehicle data after storing the vehicle data and history data in the memory when the vehicle data obtained by the sensor is different from existing data stored in the memory.

The setting information may include an execution time of the analysis program, a number of times of attempts to execute the analysis program, a transmission time of the analysis result data, and a transmission attempt period of the analysis result data.

The analyzing the vehicle data may include: recording execution failure information in the setting information and suspending execution of the analysis program when the number of times of execution failure of the analysis program exceeds a predetermined number of times.

The transmitting analysis result data to the server may include: repeatedly attempting to transmit the analysis result data based on the transmission attempt period when transmission failure of the analysis result data occurs.

The attempting to transmit the analysis result data may include: storing transmission failure information of the analysis result data in the memory when the start of the vehicle is off in the transmission failure state of the analysis result data; and transmitting the analysis result data when the start of the vehicle is on.

The control method may further include: when a transmission failure related to a plurality of analysis result data occurs and the size of the plurality of analysis result data failed to be transmitted exceeds a predetermined size, deleting the plurality of analysis result data based on the order stored in the memory.

The control method may further include: assigning an index number to the vehicle data; and deleting the vehicle data based on the order stored in the memory when the index number exceeds a predetermined number.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 9 is a flowchart illustrating a process related to transmission of analysis result data.

Figure 1:
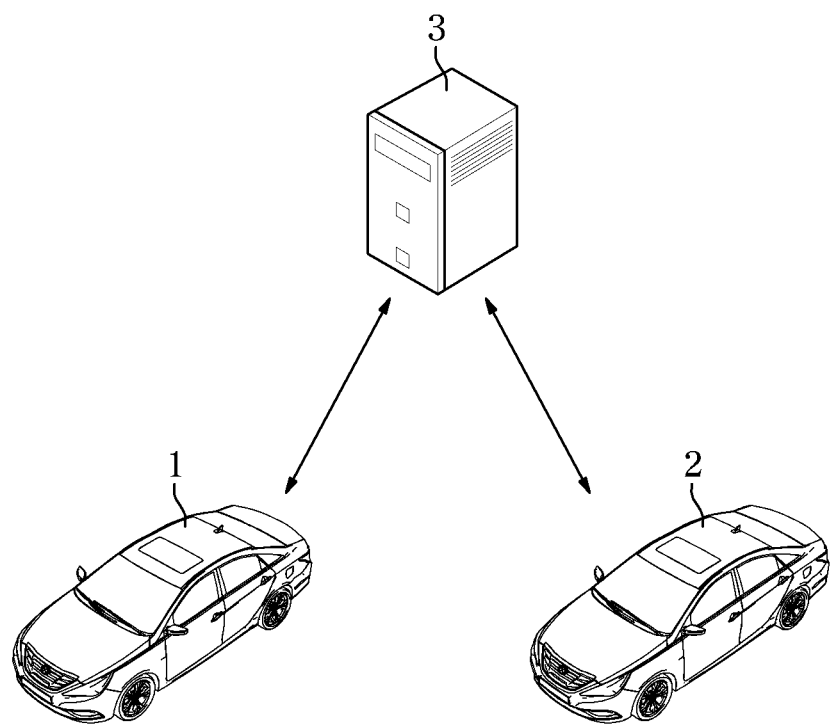
FIG. 1 illustrates a network between a vehicle and a in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

FIG. 1 illustrates a network between a vehicle and a server according to an embodiment.

Referring to FIG. 1, vehicles 1 and 2 may communicate with server 3 to transmit and receive data. For example, vehicle 1 may transmit vehicle data to server 3. The server 3 includes an analysis program and/or an analysis application, and may analyze and process vehicle data transmitted from the vehicle 1 using the analysis program. In addition, the server 3 may generate data required for the vehicle 1 and transmit it to the vehicle 1. Analysis programs may be included in telematics applications.

However, when the vehicles 1 and 2 transmitting data to the server 3 increase, data to be analyzed and processed by the server 3 rapidly increases, and an overload may occur in the server 3. Also, in order to change the analysis logic or analysis program, there was a problem in that the system update of the server 3 should be performed. In this case, a data processing time by the server 3 is delayed and real-time data analysis is impossible.

To solve this problem, the present disclosure aims to reduce the load on the server 3 by the vehicle 1 analyzing the vehicle data by itself and sending the analysis result data to the server 3.

In addition, the present disclosure aims to reduce the communication cost and improve the stability of the analysis system by changing only the analysis logic or analysis program without having to update the entire analysis system of the server 3.

Figure 2:
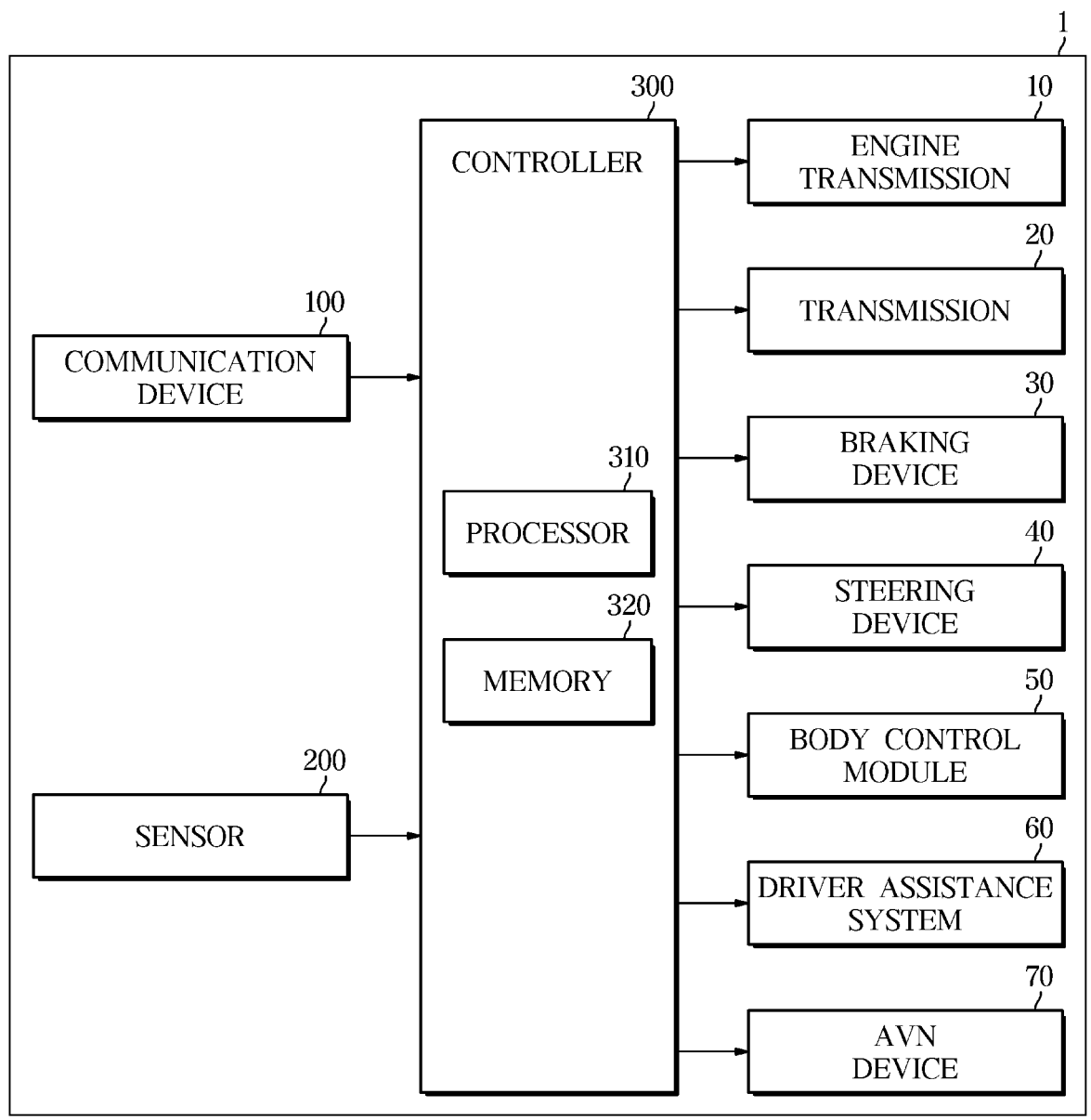
FIG. 2 illustrates a configuration of a vehicle in one form of the present disclosure.

FIG. 2 illustrates a configuration of a vehicle according to an embodiment.

Referring to FIG. 2, the vehicle 1 according to an embodiment may include an engine 10, a transmission 20, a braking device 30 and a steering device 40. The engine 10 includes a cylinder and a piston, and may generate power for the vehicle 1 to travel. The transmission 20 includes a plurality of gears and may transmit power generated by the engine 10 to the wheels. The braking device 30 may slow down the vehicle 1 or stop the vehicle 1 through friction with the wheels. The steering device 40 may change the driving direction of the vehicle 1.

In addition, the vehicle 1 may include a plurality of electronic components. For example, a body control module (BCM) 50, a driver assistance system 60, and an AVN device 70 may be further included.

The body control module 50 may control the operation of electrical components that provide convenience to the driver or ensure the safety of the driver. For example, the body control module 50 may control a head lamp, a wiper, a cluster, a multifunction switch, a direction lamp, and the like.

The driver assistance system 60 may assist the driver in manipulating (driving, braking, steering) the vehicle 1. For example, the driver assistance system may detect an environment around the vehicle 10 (eg, another vehicle, pedestrian, cyclist, lane, road sign, etc.) and control driving and/or braking and/or steering of the vehicle 1 in response to the detected environment.

The driver assistance system may provide various functions to the driver. For example, the driver assistance system 250 may provide at least one of Lane Departure Warning (LDW), Lane Keeping Assist (LKA), High Beam Assist (HBA), Autonomous Emergency Braking (AEB), Traffic Sign Recognition (TSR), Smart Cruise Control (SCC), and Blind Spot Detection (BSD).

The AVN device 70 may be provided at the center fascia of the vehicle 1. The AVN device 70 may include a display and an audio device. In addition, the speaker installed on the dashboard and the door of the vehicle 1 may be understood to be included in the AVN device 70. The display outputs a screen, and the audio device outputs sound. The display may display a graphical user interface (GUI) that may interact with the user. The display of the AVN device 70 may be a light emitting diode (LED) panel, an organic light emitting diode (OLED) panel, or a liquid crystal display panel.

The AVN device 70 may include various input buttons. Also, the display of the AVN device 70 may include a touch panel. The AVN device 70 may execute various functions based on a user command input through an input button or a touch panel. For example, the AVN device 70 may perform a navigation function, a DMB function, an audio function, and/or a video function.

In addition, the vehicle 1 may further include an engine management system (EMS), transmission control unit (TCU), electronic brake control module and electronic power steering (EPS).

The vehicle 1 may include a communication device 100, a sensor 200 and a controller 300. The communication device 100 may obtain various information from devices external to the vehicle 1. The communication device 100 may perform communication with the server 3. The communication device 100 may communicate with an external device using wireless communication technologies such as Wi-Fi, wireless local area network (WLAN), ultra-mobile broadband (UMB), and long term evolution (LTE).

The sensor 200 may obtain sensing data related to the exterior of the vehicle 1 and/or behavior data of the vehicle 1. For example, the sensor 200 may include an image sensor such as a camera, a non-image sensor such as a radar, a speed sensor detecting the speed of the wheel, an acceleration sensor detecting a lateral acceleration and a longitudinal acceleration of the vehicle, a yaw rate sensor for detecting a change in the angular velocity of the vehicle, a gyro sensor for detecting the inclination of the vehicle, and/or a steering angle sensor for detecting the rotation and steering angle of the steering wheel. The behavior data may include the speed, longitudinal acceleration, lateral acceleration, steering angle, driving direction, yaw rate and/or inclination of the vehicle 1.

The controller 300 includes a processor 310 and a memory 320. The controller 300 may include one or more processors 310. The one or more processors 310 included in the controller 300 may be integrated in one chip, or physically separated. Also, the processor 310 and the memory 320 may be implemented as a single chip. The above-described components of the vehicle 1 may be electrically connected to the controller 300. That is, the controller 300 may control an engine 10, a transmission 20, a braking device 30, a steering device 40, a body control module 50, a driver assistance system 60, an AVN device 70 and a sensor 200.

The processor 310 may process vehicle data. Vehicle data may include data related to the engine 10, transmission 20, braking device 30, steering device 40, body control module 50, driver assistance system 60, AVN device 70 and sensor 200. Since the components of the above-described vehicle 1 are exemplary, the vehicle 1 may include other devices than those described. That is, objects controlled by the controller 300 and vehicle data processed by the processor 310 are not limited to those illustrated.

The memory 320 may store programs and/or applications for operating various devices of the vehicle 1. The memory 320 may store vehicle data, and the processor 310 may store an analysis program/analysis application for processing vehicle data, and a setting information and an analysis result data.

Further, the memory 320 may store programs and/or data for the processor 310 to generate control signals regarding the configuration of the vehicle 1. In addition, the memory 320 may store result data which the processor 310 has processed the vehicle data.

The memory 340 may include a nonvolatile memory such as a flash memory, a read only memory (ROM), an erasable programmable read only memory (EPROM), or the like, as well as a volatile memory such as an S-RAM and a D-RAM.

The devices included in the above-described vehicle 1 may communicate with each other through a vehicle communication network NT. For example, the components of vehicle 1 may exchange data through Ethernet, Media Oriented Systems Transport (MOST), Flexray, Controller Area Network (CAN), and Local Interconnect Network (LIN) or the like.

Hereinafter, the operation of the vehicle 1 according to an embodiment will be described in detail.

Figure 3:
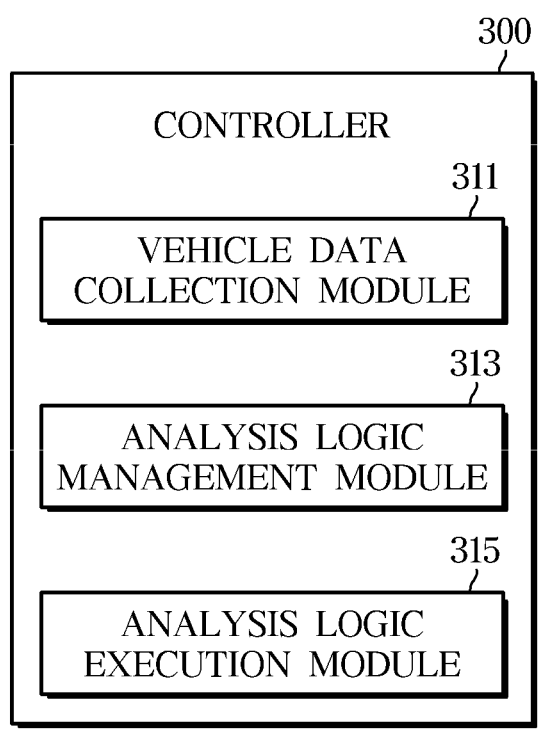
FIG. 3 illustrates a configuration of a controller in one form of the present disclosure.

FIG. 3 illustrates a configuration of a controller according to an embodiment.

Referring to FIG. 3, the controller 300 and/or processor 310 of the vehicle 1 according to an embodiment may include a vehicle data collection module 311, an analysis logic management module 313, and an analysis logic execution module 315.

The vehicle data collection module 311 may obtain vehicle data through a network in the vehicle 1. The vehicle data collection module 311 may obtain data related to an engine 10, a transmission 20, a braking device 30, a steering device 40, a body control module 50, a driver assistance system 60, an AVN device 70 and sensor 200. In addition, the vehicle data collection module 311 may obtain data regarding devices constituting the vehicle 1. The vehicle data collection module 311 may store the obtained vehicle data in the memory 320.

The vehicle data collection module 311 assigns an index number to vehicle data, and when the index number exceeds a predetermined number, the vehicle data collection module 311 may delete vehicle data based on the order stored in the memory 320. That is, the vehicle data collection module 311 may sequentially delete the oldest vehicle data.

In addition, the vehicle data collection module 311 may include a callback function. An analysis program required to analyze vehicle data may be called by the callback function.

The analysis logic management module 313 may obtain analysis program and setting information regarding vehicle data from the server 3 through the communication device 100. The setting information may include the execution time of the analysis program, the number of times of attempts to execute the analysis program, the transmission time of analysis result data, and the transmission attempt period of analysis result data.

Analysis programs may be plural. There may be multiple analysis programs for one vehicle data. In addition, a plurality of analysis programs for each of a plurality of vehicle data may exist. Multiple analysis programs may be executed independently. That is, each of the plurality of analysis programs may be set so as not to affect each other, and each analysis program may be executed as an independent thread. When there are a plurality of analysis programs, setting information may include information of an analysis program to be executed corresponding to the obtained vehicle data.

The analysis logic execution module 315 may control the communication device 100 to analyze vehicle data using analysis program and setting information, and transmit analysis result data of vehicle data to the server 3. The analysis logic execution module 315 may store analysis result data in the memory 320. Analysis result data may be transmitted to the server 30 based on the MOF and JSON protocols.

Meanwhile, the analysis logic execution module 315 may sequentially store a plurality of analysis result data generated by execution of a plurality of analysis programs in the memory 320 in the order in which they are generated.

The analysis logic execution module 315 may trigger an analysis event related to vehicle data when the vehicle data obtained by the vehicle data collection module 311 matches the existing data stored in the memory 320.

The analysis logic execution module 315 may trigger an analysis event related to vehicle data after storing the vehicle data and history data in the memory 320 when the obtained vehicle data is different from existing data stored in the memory 320.

Meanwhile, when the number of times of execution failures of the analysis program exceeds a predetermined number of times, the analysis logic execution module 315 may record execution failure information in setting information and suspend execution of the analysis program.

The analysis logic execution module 315 may repeatedly attempt to transmit analysis result data based on a transmission attempt period included in setting information when transmission failure of analysis result data occurs.

Meanwhile, the analysis logic execution module 315 may store the transmission failure information of the analysis result data in the memory 320 when the start of the vehicle is off in the transmission failure state of the analysis result data. The analysis logic execution module 315 may control the communication device 100 to transmit analysis result data when the start of the vehicle is on.

In addition, when a transmission failure related to a plurality of analysis result data occurs and the size of the plurality of analysis result data failed to be transmitted exceeds a predetermined size, the analysis logic execution module 315 may delete the plurality of analysis result data based on the order stored in the memory 320. That is, the analysis logic execution module 315 may sequentially delete the oldest analysis result data.

Figure 4:
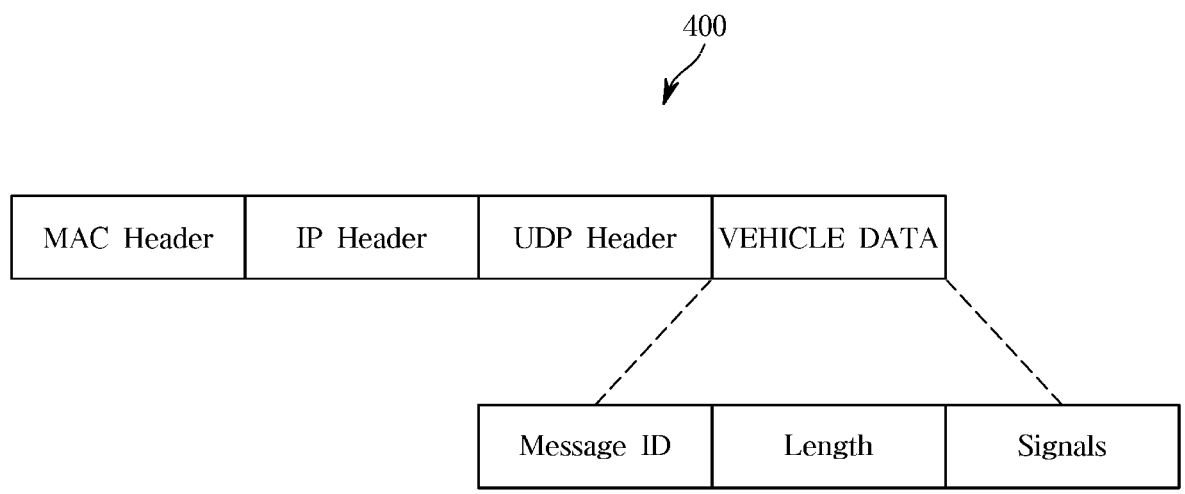
FIG. 4 illustrates an Ethernet frame including vehicle data.

FIG. 4 illustrates an Ethernet frame including vehicle data.

Referring to FIG. 4, the Ethernet frame 400 may include a MAC header, an IP header, a UDP header, and vehicle data. Vehicle data may include Message ID, Length and signals. Since the Ethernet frame 400 is known, a detailed description is omitted.

Figure 5:
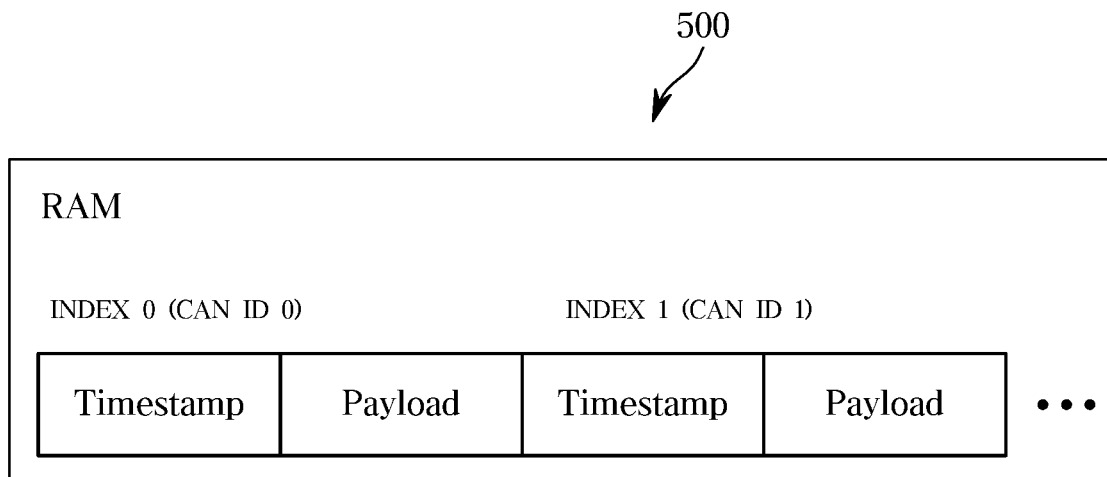
FIG. 5 illustrates data stored in RAM that is a component of memory.
Figure 6:
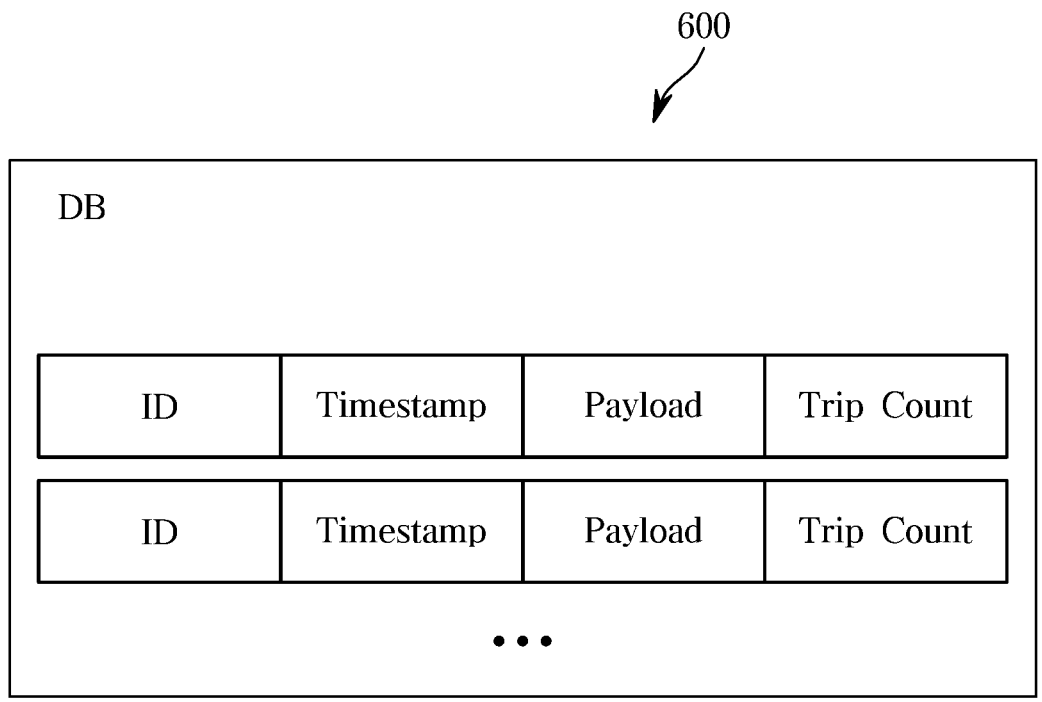
FIG. 6 illustrates data stored in a database that is a component of memory.

FIG. 5 illustrates data stored in RAM that is a component of memory. FIG. 6 illustrates data stored in a database that is a component of memory.

Referring to FIG. 5, the controller 300 may store vehicle data in RAM constituting the memory 320. Vehicle data stored in RAM may be defined as existing data, and may be used to check vehicle data obtained thereafter. When the obtained vehicle data matches existing data stored in the memory 320, the controller 300 may quickly trigger an analysis event related to the vehicle data.

The controller 300 may assign an index number to vehicle data stored in RAM. The index number may be a CAN ID. When vehicle data is obtained through CAN, vehicle data is transmitted as a CAN message. The CAN message contains the CAN ID. Since the contents related to the CAN message are known, detailed descriptions thereof will be omitted.

Referring to FIG. 6, when the obtained vehicle data is different from existing data stored in the memory 320, the controller 300 stores vehicle data and history data in a database DB constituting the memory 320. After that, controller 300 may trigger an analysis event related to vehicle data. Vehicle data stored in a database DB may include ID, Timesmp, Payload, and TripCount.

When the index number exceeds the predetermined number, the controller 300 may delete vehicle data based on the order stored in the memory 320.

Figure 7:
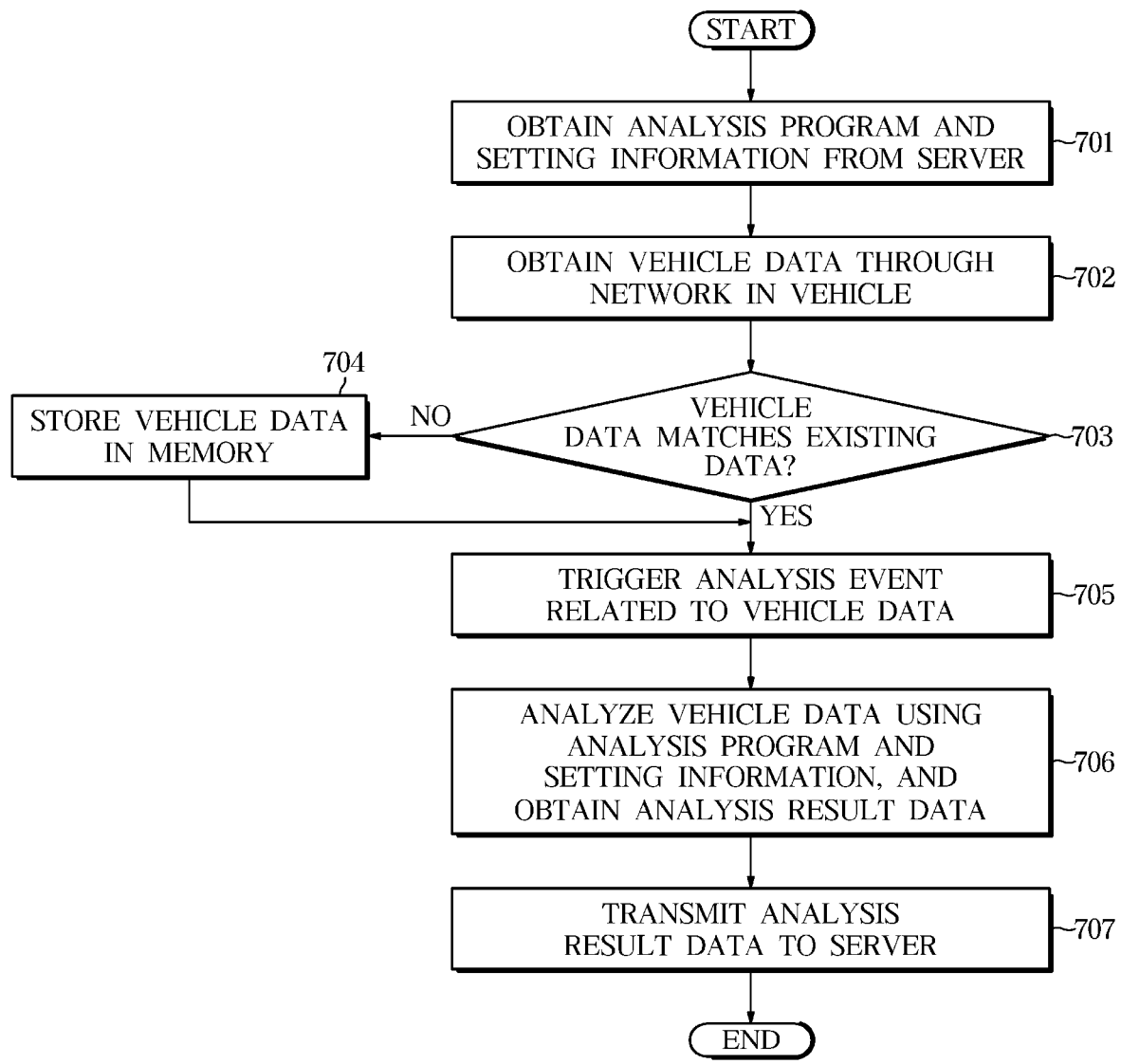
FIG. 7 is a flowchart illustrating a control method of a vehicle in one form of the present disclosure.

FIG. 7 is a flowchart illustrating a control method of a vehicle according to an embodiment.

Referring to FIG. 7, the controller 300 may obtain analysis program and setting information regarding vehicle data from the server 3 through the communication device 100 (701). The setting information may include the execution time of the analysis program, the number of times of attempts to execute the analysis program, the transmission time of analysis result data, and the transmission attempt period of analysis result data.

The controller 300 may obtain vehicle data through a network in the vehicle 1 (702). Vehicle data may be defined as data related to devices constituting the vehicle 1. The controller 300 may store the obtained vehicle data in the memory 320.

The controller 300 may determine whether the obtained vehicle data matches existing data stored in the memory 320 (703). The controller 300 may trigger an analysis event related to vehicle data when the obtained vehicle data matches existing data stored in the memory 320 (705).

When the obtained vehicle data is different from existing data stored in the memory 320, the controller 300 may store vehicle data and history data in the memory 320 (704), and then trigger an analysis event related to the vehicle data (705).

The controller 300 may analyze vehicle data using an analysis program and setting information, and obtain analysis result data of vehicle data (706). The controller 300 may store analysis result data in the memory 320. The controller 300 may sequentially store a plurality of analysis result data generated by execution of a plurality of analysis programs in the memory 320 in the order in which they are generated.

The controller 300 may control the communication device 100 to transmit the analysis result data to the server 3 (707). The plurality of analysis result data may be transmitted to the server 3 in the order stored in the memory 320.

Figure 8:
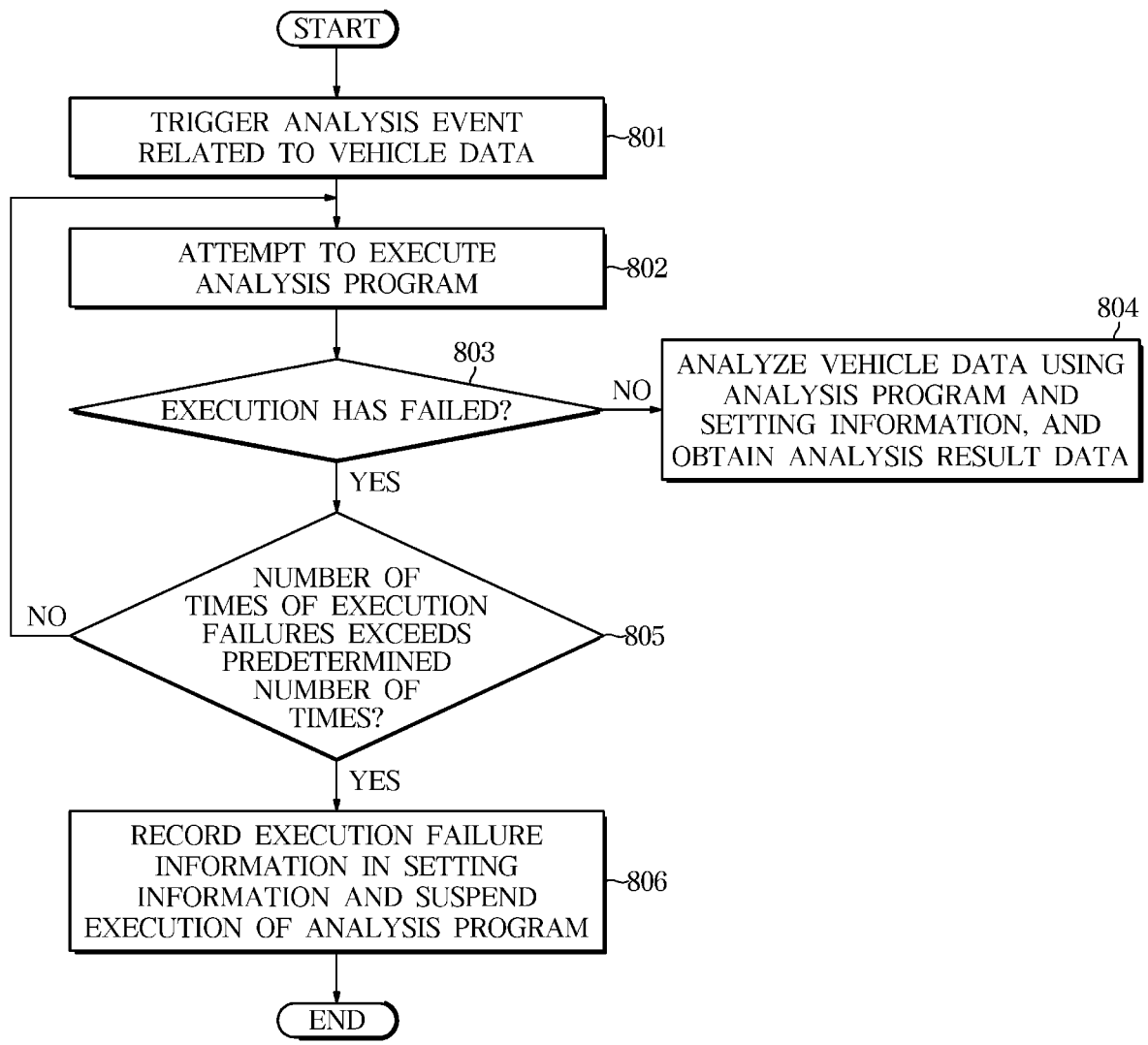
FIG. 8 is a flowchart illustrating a process related to execution of an analysis program.

FIG. 8 is a flowchart illustrating a process related to execution of an analysis program.

Referring to FIG. 8, the controller 300 may trigger an analysis event related to vehicle data (801). This is the same as described in 705 of FIG. 7. The controller 300 may attempt to execute the analysis program as the analysis event is triggered (802).

The controller 300 may determine whether the execution of the analysis program has failed (803). When the number of times of execution failures of the analysis program exceeds a predetermined number of times, the controller 300 may record execution failure information in setting information and suspend execution of the analysis program (805, 806).

When the analysis program is successfully executed, the controller 300 may analyze vehicle data using an analysis program and setting information, and obtain analysis result data (804).

FIG. 9 is a flowchart illustrating a process related to transmission of analysis result data.

Referring to FIG. 9, the controller 300 may attempt to transmit analysis result data to the server 3 (901). In addition, the controller 300 may determine whether transmission failure of the analysis result data (902). When the transmission failure of the analysis result data occurs, the controller 300 may repeatedly attempt to transmit the analysis result data based on the transmission attempt period included in the setting information (903).

The controller 300 may store the transmission failure information of the analysis result data in the memory 320 when the start of the vehicle is off in the transmission failure state of the analysis result data (904, 905). The controller 300 may control the communication device 100 to transmit analysis result data when the start of the vehicle is on (906).

When a transmission failure related to a plurality of analysis result data occurs and the size of the plurality of analysis result data failed to be transmitted exceeds a predetermined size, the controller 300 may delete the plurality of analysis result data based on the order stored in the memory 320. That is, the controller 300 may sequentially delete the oldest analysis result data.

The disclosed vehicle and control method thereof may secure real-time performance in analyzing vehicle data and reduce server load.

In addition, the disclosed vehicle and control method thereof may change analysis logic or analysis program used to analyze vehicle data without having to update the entire analysis system. Therefore, the communication cost may be reduced, and the stability of the analysis system may be improved.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that may be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
a communication device configured to communicate with a server; and
a controller configured to:
obtain a vehicle data through a network in the vehicle;
obtain an analysis program and a setting information about the vehicle data from the server;
analyze the vehicle data using the analysis program and the setting information; and
control the communication device to transmit an analysis result data of the vehicle data to the server.

2. The vehicle according to claim 1, wherein the controller comprises:
a memory configured to store the vehicle data, the analysis program, the setting information and the analysis result data.

3. The vehicle according to claim 2, wherein the controller is configured to:
trigger an analysis event related to the vehicle data when the obtained vehicle data matches existing data stored in the memory.

4. The vehicle according to claim 2, wherein the controller is configured to:
trigger an analysis event related to the vehicle data after storing the vehicle data and a history data in the memory when the obtained vehicle data does not match existing data stored in the memory.

5. The vehicle according to claim 2, wherein the setting information comprises an execution time of the analysis program, a number of times of attempts to execute the analysis program, a transmission time of the analysis result data, and a transmission attempt period of the analysis result data.

6. The vehicle according to claim 5, wherein the controller is configured to:
record execution failure information in the setting information and suspend execution of the analysis program when the number of times of execution failure of the analysis program exceeds a predetermined number of times.

7. The vehicle according to claim 5, wherein the controller is configured to:
repeatedly attempt to transmit the analysis result data based on the transmission attempt period when transmission failure of the analysis result data occurs.

8. The vehicle according to claim 7, wherein the controller is configured to:
store transmission failure information of the analysis result data in the memory when the vehicle is off in the transmission failure state of the analysis result data; and
control the communication device to transmit the analysis result data when the vehicle is on.

9. The vehicle according to claim 7, wherein the controller is configured to:
delete a plurality of analysis result data based on an order stored in the memory when a transmission failure related to the plurality of analysis result data occurs and the size of the plurality of analysis result data failed to be transmitted exceeds a predetermined size.

10. The vehicle according to claim 2, wherein the controller is configured to:
assign an index number to the vehicle data; and
delete the vehicle data based on an order stored in the memory when the index number exceeds a predetermined number.

11. A control method of a vehicle comprising:
obtaining vehicle data through a network in the vehicle;
obtaining analysis program and setting information about the vehicle data from the server;
analyzing the vehicle data using the analysis program and the setting information; and
transmitting analysis result data of the vehicle data to the server.

12. The control method according to claim 11, where in the method further comprises:
storing the vehicle data, the analysis program, the setting information and the analysis result data in a memory.

13. The control method according to claim 12, wherein analyzing the vehicle data comprises:
triggering an analysis event related to the vehicle data when the obtained vehicle data matches existing data stored in the memory.

14. The control method according to claim 12, wherein analyzing the vehicle data comprises:
triggering an analysis event related to the vehicle data after storing the vehicle data and history data in the memory when the obtained vehicle data does not match existing data stored in the memory.

15. The control method according to claim 12, wherein the setting information comprises an execution time of the analysis program, a number of times of attempts to execute the analysis program, a transmission time of the analysis result data, and a transmission attempt period of the analysis result data.

16. The control method according to claim 15, wherein analyzing the vehicle data comprises:
recording execution failure information in the setting information and suspending execution of the analysis program when the number of times of execution failure of the analysis program exceeds a predetermined number of times.

17. The control method according to claim 15, wherein transmitting the analysis result data to the server comprises:
repeatedly attempting to transmit the analysis result data based on the transmission attempt period when transmission failure of the analysis result data occurs.

18. The control method according to claim 17, wherein attempting to transmit the analysis result data comprises:
storing transmission failure information of the analysis result data in the memory when the vehicle is off in the transmission failure state of the analysis result data; and
transmitting the analysis result data when the vehicle is on.

19. The control method according to claim 17, wherein the method further comprises:
when a transmission failure related to a plurality of analysis result data occurs and a size of the plurality of analysis result data failed to be transmitted exceeds a predetermined size, deleting the plurality of analysis result data based on an order stored in the memory.

20. The control method according to claim 12, wherein the method further comprises:
assigning an index number to the vehicle data; and
deleting the vehicle data based on an order stored in the memory when the index number exceeds a predetermined number.

* * * * *